United States Patent Office 3,679,578
Patented July 25, 1972

3,679,578
REFORMING A PARAFFINIC FRACTION WITH A PLATINUM-RHENIUM CATALYST
Milton H. Dalson, 1 Ogden Road, Mendham, N.J. 07945; James P. Gallagher, 325 Indiana, Park Forest, Ill. 60466; Carl D. Keith, 100 Crest Drive Countryside, Summit, N.J. 07901; and William C. Pfefferle, 51 Woodland Drive, Middletown, N.J. 07748
No Drawing. Filed June 12, 1970, Ser. No. 45,895
Int. Cl. C10g 35/08
U.S. Cl. 208—138     2 Claims

ABSTRACT OF THE DISCLOSURE

Paraffinic fractions of 6 to 8 carbon atoms made from naphtha reformate are reformed in contact with a catalyst containing platinum and rhenium supported on a porous, solid base, for instance, alumina.

---

This invention relates to the catalytic reforming of highly paraffinic fractions which have been separated from reformate in order to dehydrocyclize paraffins and thereby produce aromatics. The catalyst used contains platinum and rhenium supported on a porous, solid base, such as alumina.

It is known to improve the octane number of straight run petroleum naphthas by passing them at elevated temperatures and pressures along with hydrogen into content with a catalyst which can be platinum supported on alumina or which can be both platinum and rhenium supported on alumina. When the naphthas are so reformed, there is produced a reformate containing a high proportion of aromatic compounds. It is also known to separate the aromatic compounds from the reformate by a variety of means, including solvent extraction. When this is done, there remains a fraction which is highly paraffinic in nature and which is of low value as a motor fuel due to its low octane number. It is also known to upgrade this highly paraffinic fraction by reforming it using a platinum on alumina catalyst. When this is done, paraffins are dehydrocyclized to aromatics. This is a severe reaction, resulting in an undesirably high rate of deactivation of the catalyst, so that there is a need in the art for an improved process for reforming the highly paraffinic fraction separated from reformate.

In accordance with the present invention, an improved process for reforming the highly paraffinic fraction separated from reformate is provided by the use of a catalyst comprising both platinum and rhenium supported on a porous, solid carrier, such as alumina. In general, the process is carried out at a pressure from 100–300 p.s.i.g., a weight hourly space velocity (WHSV, meaning weight units of paraffinic fraction per weight unit of catalyst per hour) of from 0.5 to 20 and at a temperature entering the catalyst bed or beds of from 750 to 1,000° F., preferably from 850 to 950° F. Hydrogen at the rate of from 2 to 20 mols per mol of paraffinic fraction is also passed through the catalyst in admixture with the paraffinic fraction.

The paraffinic fraction treated in accordance with the invention is one separated from reformate produced by the catalytic reforming of straight run petroleum naphtha, generally with a catalyst comprising platinum supported on a porous alumina base. When straight run naphtha is reformed, the reformate is generally fractionated to produce a gaseous fraction, which is partially recycled to the reaction system, and a liquid fraction. The liquid fraction can be separated into an aromatic fraction and the paraffinic fraction, which is reformed in accordance with the method of this invention. There are a number of different ways known to the art for performing the separation to produce the aromatic fraction and the paraffinic fraction. Among such ways are the use of molecular sieves (e.g., Linde Type 5A); the use of solvent extraction (e.g., with liquid sulfur dioxide or diethylene glycol); the use of extractive distillation (e.g., with phenol, cresylic acids, sulfolanes or glycol-water mixtures); and by the use of silica gel. In general, the paraffinic fraction will contain molecules having from 6 to 8 carbon atoms; will contain from 3 to 10% by weight of aromatics, from 3 to 10% by weight of naphthenes, with the remainder being paraffins; and will have a sulfur content of 10 parts per million or less by weight.

As has been stated above, the catalyst employed in reforming the highly paraffinic fraction in accordance with the method of this invention contains both platinum and rhenium supported on a porous, solid base. In general, the catalyst will contain from 0.1 to 3% by weight of platinum and from 0.01 to 5% by weight of rhenium. The porous, solid base or carrier for the platinum and rhenium can be any of a large number of materials which have heretofore been used in the art as catalyst supports. Thus, the carrier can be, for example, silicon carbide, charcoal or carbon. Preferably, the carrier is an inorganic oxide. A high surface area inorganic oxide is particularly preferred, for example, an inorganic oxide having a surface area of from 50 to 700 square meters per gram. The carrier can be a natural or a synthetically produced inorganic oxide or combination of inorganic oxides. Acidic inorganic oxide supports which can be used are the naturally occurring aluminum silicates, particularly when acid treated to increase the activity, and the synthetically-produced, cracking supports, such as silica-alumina, silica-zirconia, silica-alumina-zirconia, silca-magnesa, silica-alumina-magnesia, and crystalline zeolitic luminosilicates. Generally, however, the reforming process of this invention is preferably conducted using catalysts having low cracking activity, that is, catalysts of limited acidity. Hence, preferred carriers are inorganic oxides, such as magnesia and alumina.

A particularly preferred catalytic carrier for the purposes of this invention is alumina. Any of the forms of alumina suitable as a support for reforming catalysts can be used. A particularly desirable alumina is one which is characterized by large pore, high area base structure, essentially composed of gamma alumina modifications resulting from the drying and calcination of a mixture of precursor hydrous alumina phases containing about 65 to 95% of trihydrate. The preparation of such alumina is described in U.S. Pat. No. 2,838,444. The alumina base can, if desired, contain from 0.3 to 1.5% by weight of halogen, such as chlorine or fluorine. Further details concerning the preparation of platinum-rhenium catalysts are set forth in U.S. Pat. No. 3,415,737 to Kluksdahl.

When the catalyst is initially contacted with the paraffinic feed, the platinum and rhenium are preferably in sulfided form. The platinum and rhenium, when in the form of free metal, can easily be sulfided by contacting the catalyst with hydrogen sulfide or dimethyldisulfide until the catalyst no longer absorbs the hydrogen sulfide or dimethyldisulfide. On the other hand, hydrogen sulfide or dimethyldisulfide can be contacted with the catalyst along with the paraffinic fraction at the time when the paraffinic fraction is initially introduced, in the event that one wishes to initiate the reforming operation with a catalyst in which the platinum and rhenium are in the form of free metal. When the operation is carried out in this manner, the amount of hydrogen sulfide or dimethyldisulfide introduced is at least about 50%, or even at least about 80%, of the stoichiometric amount needed to give one atomic weight of sulfur for each atomic weight of total platinum and rhenium in the catalyst. Advantageously, the hydrogen introduced into the reaction system will have admixed with it from about 5 to about 100 parts per million by volume of water vapor.

EXAMPLE

The paraffinic fraction used as feed is one which has been separated from reformate produced by the reforming of straight run naphtha with a platinum-alumina catalyst. The lowest boiling materials contained in the paraffinic fraction are paraffins having six carbon atoms, and the paraffinic fraction has an end point of 275° F. ASTM. The paraffinic fraction contains 7% by weight of aromatics and 8% by weight of naphthenes, with the remainder being paraffins. The sulfur content is one part per million by weight and the research octane number neat is 38.

The catalyst used contains 0.6% by weight of platinum and 0.6% by weight of rhenium on an alumina base prepared in accordance with the teachings of U.S. Pat. No. 2,838,444 to Teter, Gring and Keith. The base is composed of about 9% by weight of amorphous alumina, about 10% by weight of boehmite, about 28% by weight of bayerite, and about 53% by weight of Nordstrandite plus gibbsite, and contains about 0.75% by weight of chloride. The catalyst is presulfided by passing through it at 750° F. and 100 p.s.i.g. a mixture composed of 99% by weight of hydrogen and 1% by weight of hydrogen sulfide. The mixture of hydrogen and hydrogen sulfide is passed through the catalyst until the amount of sulfide agent is about 200% of the stoichiometric amount needed to give one atomic weight of sulfur for each atomic weight of total platinum and rhenium in the catalyst.

The catalyst is disposed in three reactors which are arranged in series. The reaction system also includes three furnaces, one being located before the first reactor, the second being located between the first and second reactors, and the third being located between the second and third reactors. The second reactor contains two times as much catalyst as is contained in the first reactor, and the third reactor contains six times as much catalyst as is contained in the first reactor. The reforming operation is carried out at a hydrogen to hydrocarbon molar ratio of 5:1, a pressure going into the first reactor of 250 p.s.i.g., and at an initial temperature for each reactor of 935° F. The hydrogen introduced in the reaction system contains 15 parts per million of water vapor by volume. When the operation is carried out at a weight hourly space velocity of two, based upon the total weight of catalyst in the three reactors, there is produced, upon fractionation of the effluent from the third reactor, a product having a research octane number neat of 95.

It is claimed:

1. A process for reforming a paraffinic fraction separated from reformate produced by the reforming of straight run petroleum naphtha which comprises passing the paraffinic fraction in admixture with from 2 to 20 mols of hydrogen per mol of paraffinic fraction into contact with a catalyst containing from 0.1 to 3% by weight of platinum and from 0.01 to 5% by weight of rhenium supported on a porous, solid base at a temperature entering the catalyst bed or beds of from 750 to 1,000° F., a pressure of from 100 to 300 p.s.i.g. and at a weight hourly space velocity of from 0.5 to 20, the said paraffinic fraction consisting essentially of compounds having from 6 to 8 carbon atoms, the said fraction consisting essentially of from 3 to 10% by weight of aromatics, from 3 to 10% by weight of naphthenes, with the remainder being paraffins, and the said paraffinic fraction containing not more than 10 parts per million by weight of sulfur.

2. The process of claim 1 wherein said porous, solid base is alumina.

References Cited

UNITED STATES PATENTS

| 2,867,576 | 1/1959 | Honeycutt | 208—65 |
| 2,938,853 | 5/1960 | Ammer et al. | 208—65 |
| 3,415,737 | 12/1968 | Kluksdahl | 208—138 |

FOREIGN PATENTS

| 786,835 | 11/1957 | Great Britain | 208—65 |

HERBERT LEVINE, Primary Examiner

U.S. Cl. X.R.

208—65, 141